Figure 1:
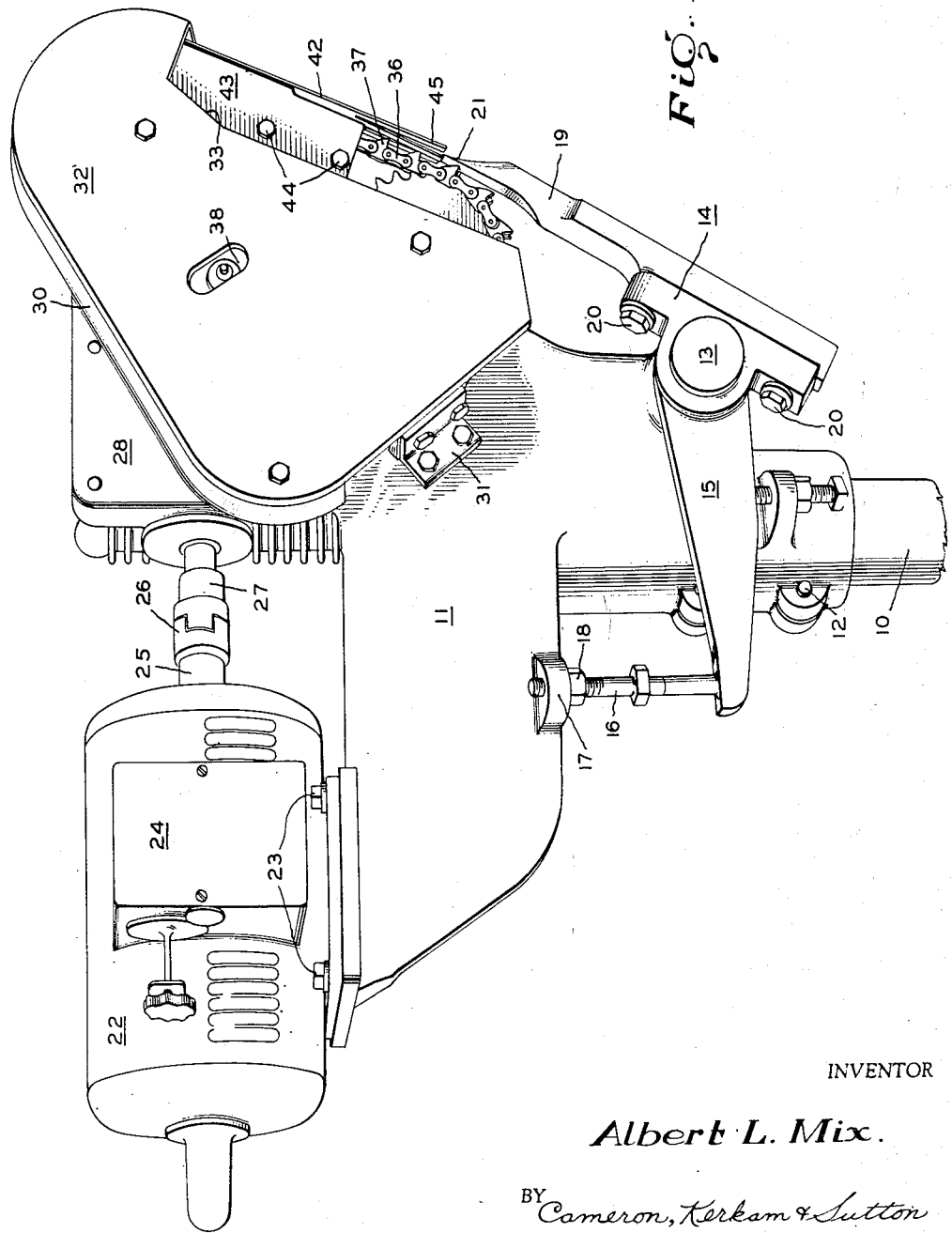

March 5, 1957     A. L. MIX     2,783,801
COCONUT SHELLING MACHINE
Filed Sept. 19, 1955     2 Sheets-Sheet 1

INVENTOR
*Albert L. Mix.*
BY *Cameron, Kerkam & Sutton*
ATTORNEYS

March 5, 1957     A. L. MIX     2,783,801
COCONUT SHELLING MACHINE
Filed Sept. 19, 1955     2 Sheets-Sheet 2

INVENTOR
Albert L. Mix.

BY Cameron, Kerkam & Sutton
ATTORNEYS

United States Patent Office 2,783,801
Patented Mar. 5, 1957

2,783,801

COCONUT SHELLING MACHINE

Albert L. Mix, Battle Creek, Mich., assignor to General Foods Corporation, New York, N. Y., a corporation of Delaware Application September 19, 1955, Serial No. 534,966

10 Claims. (Cl. 146—7)

This invention relates to coconut shelling machines and, more particularly, to such machines for removing the hard shell of the coconut adjacent the meat of the coconut after the husk of the coconut has been removed.

More particularly, this invention relates to such machines in which an eye of the coconut is manually impaled on a knife mounted on the machine and the coconut is then engaged by traveling chain mechanism to move the coconut on the knife to break the shell away from the meat.

Heretofore, mechanisms have been proposed to remove the shell from the meat of the coconut as by cutting grooves in the shell and the like but these machines have had various disadvantages so that the operation of removing the shell from the meat of the coconut has remained primarily a manual one.

The manual operation of removing the shell from the meat of the coconut is laborious involving the use of a fixed knife which is inserted into an eye of the coconut and the coconut is then moved manually on the knife to break the shell away from the meat. This manual operation requires skill and is time consuming.

By the present invention a novel mechanism is for the first time provided by which the coconut is moved about on the knife to break the shell away by efficient mechanical means resulting in a saving of time and labor. Employing this machine, the knife is inserted in an eye of the coconut and the coconut is then engaged by a toothed endless chain the teeth of which engage the shell of the coconut to move the coconut on the knife to break the shell from the meat, the operator guiding the movement of the coconut on the knife.

It is accordingly an object of the present invention to provide a novel machine for removing the shell from the meat of coconuts in which a toothed endless chain engages the shell of the coconut moving the same on a knife to break the shell from the meat of the coconut.

Another object is to provide such a mechanism which is relatively cheap and easy to manufacture; which does not require a skilled operator; in which maintenance is reduced to a minimum; and which is adjustable for various thicknesses of coconut shell.

Other and further objects of the present invention will appear from the following description of an illustrative embodiment thereof.

The coconut shelling machine of the present invention is capable of various mechanical embodiments, one of which is shown in the accompanying drawings and is described hereinafter to illustrate the invention. This illustrative embodiment of the present invention should in no way be construed as defining or limiting the same and reference should be had to the appended claim to determine the scope of the invention.

Figure 2:
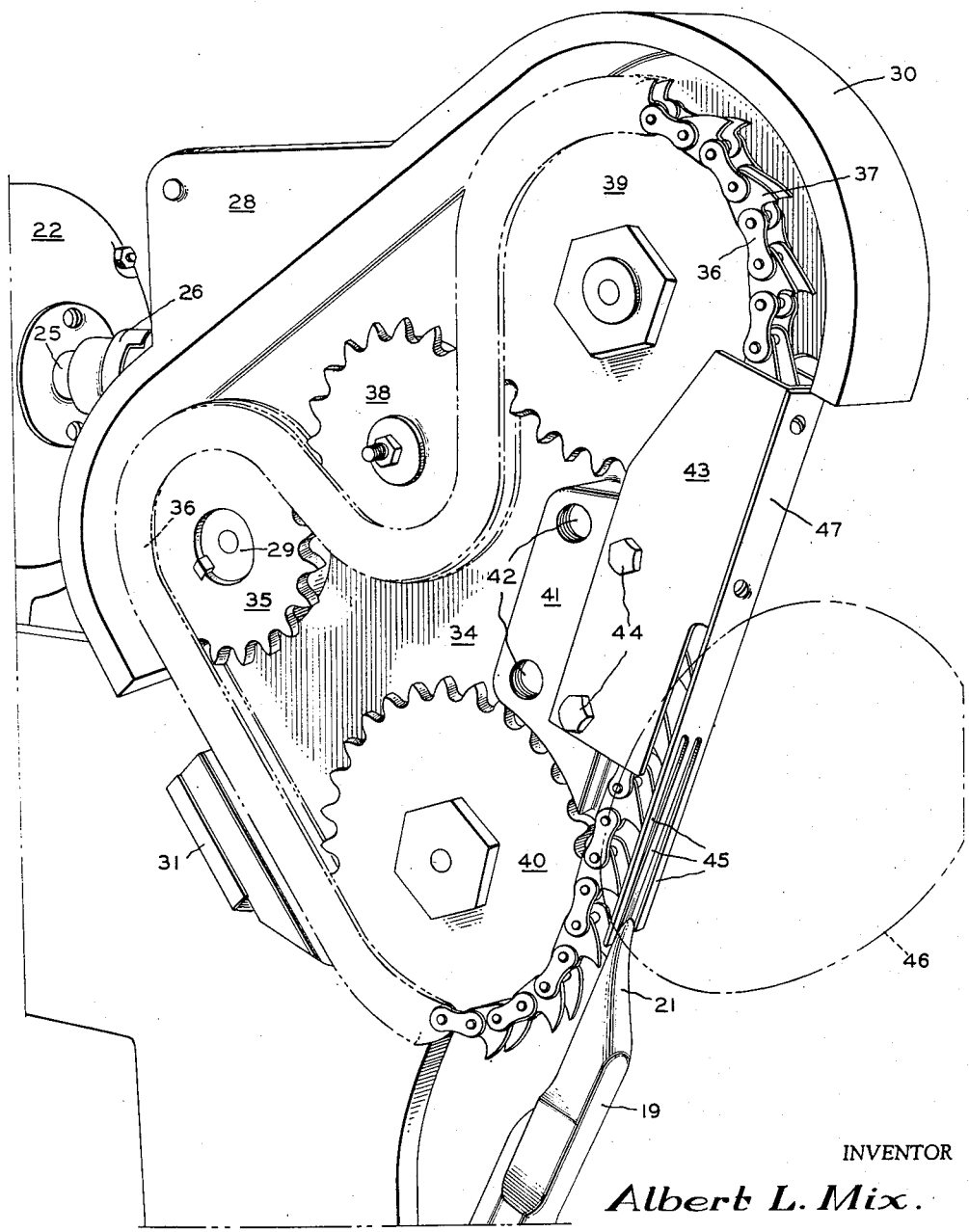

In the accompanying drawings in which like reference characters indicate like parts, Fig. 1 is a perspective view of an illustrative embodiment of the present invention showing the relative position of the several parts; and Fig. 2 is an enlarged view of a portion of Fig. 1 with the chain guard removed to show the arrangement of sprockets and chain with respect to the knife and the coconut being shelled.

Referring now to the drawings and, more particularly, to Fig. 1, the mechanism there shown includes a vertical pedestal 10 on which a machine base 11 is secured as by clamp bolts 12. Base 11 is provided with a horizontally extending cylindrical member 13 upon which knife base 14 is mounted for rotation. Knife base 14 carries arm 15 which supports adjusting screw 16. Screw 16 cooperates with stud 17 carried by base 11. Rotation of nut 18 mounted on bolt 16 and bearing against stud 17 rotates arm 15 and knife base 14 on member 13 for reasons which will appear more fully hereinafter. A coconut shelling knife 19 is secured to base 14, as by bolts 20, and knife 19 is provided with a tapered point 21 for insertion into an eye of the coconut.

A suitable electric motor 22 is mounted on base 11 as by bolts 23 and is provided with an operating switch mechanism 24. Shaft 25 of motor 22 drives through flexible coupling 26 to shaft 27 of gear box 28. Gear box 28 is provided with a horizontally disposed driven shaft 29 (Fig. 2). A chain housing 30 is mounted on base 11 by brackets 31 and is closed by plates 32 and 34, plate 32 being cut away at 33 to permit the coconut to engage knife 19.

Referring now more particularly to Fig. 2, and as noted above, shaft 29 is driven from gear box 28. A suitable sprocket 35 is keyed to shaft 29 for rotation therewith. Sprocket 35 is spaced from plates 34 to receive a suitable coconut engaging drive chain 36. Chain 36 is provided at alternate links with oppositely spaced coconut engaging teeth 37. Chain 36 is driven in a clockwise direction as seen in Fig. 2 and passes from sprocket 35 to idler sprocket 38 which is spaced from plate 34 so that spaced teeth 37 may straddle sprocket 38 as chain 36 passes thereover. From sprocket 38 chain 36 passes to idler sprocket 39 and then in a straight flight to idler sprocket 40 and then back to sprocket 35. A suitable guide or support 41 is secured by bolts 42 to plate 34 and engages the back of chain 36 along the straight flight thereof from sprocket 39 to sprocket 40 to support chain 36 and teeth 37 when in engagement with the coconut. A suitable chain guard 42 is mounted on plate 43 which in turn is secured to guide 41 by bolts 44. Guard 42 terminates in spaced resilient fingers 45 which terminate adjacent point 21 of knife 19 and prevent the operator's hands from coming in contact with chain 36. When a coconut is forced onto point 21 of knife 19 fingers 45 are bent toward chain 36 and teeth 37 pass through the spaces between them.

Knife 19 is moved with respect to chain 36 and teeth 37 by rotation of nut 18 on bolt 16 and is spaced therefrom at distances somewhat less than the thickness of the shell of the coconut.

With the coconut shelling mechanism set up as above described when motor 22 is energized, sprocket 35 is rotated and drives chain 36 in a clockwise direction as seen in Fig. 2 moving teeth 37 of chain 36 in a straight flight over guide 41 and past point 21 of knife 19. An eye of a coconut 46 is then manually impaled on point 21 of knife 19 and the shell of the coconut flexes guard fingers 45 away from point 21, teeth 37 passing between fingers 45. The shell of coconut 46 is then engaged by teeth 37 and the coconut is moved downwardly on knife 21 continuously breaking the shell of coconut 46 away from the meat. The operator manually varies the attitude of coconut 46 with respect to point 21 and knife 19 thus guiding the shelling until the coconut shell is removed from the meat.

It should now be apparent that by the present invention a coconut shelling machine is provided which in every way satisfies the several objectives described above.

Changes in or modifications to the above described illustrative embodiment of this invention may now be suggested to those skilled in the art without departing from the present inventive concept. Reference should therefore be had to the appended claims to determine the scope of this invention.

What is claimed is:

1. In a coconut shelling machine, a knife, an endless chain, teeth carried by said chain, said chain having a flight adjacent said knife, and means for driving said chain bringing said teeth into engagement with the shell of a coconut impaled on said knife, said chain moving in a direction such that said teeth impel the coconut onto said knife.

2. In a coconut shelling machine, a knife, an endless chain mounted for movement past said knife, means for adjusting the position of said knife with respect to said chain, teeth carried by said chain, said chain having a flight adjacent said knife bringing said teeth into engagement with the shell of a coconut impaled on said knife, and means for driving said chain past said knife in a direction such that said teeth impel the coconut onto said knife.

3. In a coconut shelling machine, a knife, an endless chain mounted for movement past said knife, means for adjusting the position of said knife with respect to said chain, teeth carried by said chain, said chain having a flight adjacent said knife bringing said teeth into engagement with the shell of a coconut impaled on said knife, means for moving said chain past said knife in a direction such that said teeth impel the coconut onto said knife, and means for supporting said flight of said chain against movement away from said knife.

4. In a coconut shelling machine, a knife, an endless chain mounted for movement past said knife, means for adjusting the position of said knife with respect to said chain, teeth carried by said chain, said chain having a flight adjacent said knife bringing said teeth into engagement with the shell of a coconut impaled on said knife, means for moving said chain past said knife in a direction such that said teeth impel the coconut onto said knife, means for supporting said flight of said chain against movement away from said knife, and guard means covering said flight of said chain and terminating in spaced resilient elements adjacent said knife, said teeth passing between said spaced resilient elements when said elements are displaced from said knife.

5. In a coconut shelling machine, a knife, an endless chain mounted for movement past said knife, a driving sprocket engaging said chain, a pair of spaced idling sprockets engaging said chain and providing a flight of said chain adjacent said knife, means for rotating said driving sprocket, teeth on said chain engaging the shell of a coconut impaled on said knife, means for adjusting the position of said knife with respect to said chain and guard, means covering said flight of said chain and terminating in spaced resilient elements adjacent said knife, said teeth passing between said spaced resilient elements when said elements are displaced from said knife, said chain moving in a direction such that said teeth impel the coconut onto said knife.

6. In a coconut shelling machine, a base, motor means mounted on said base, a horizontally disposed shaft driven by said motor means, a drive sprocket mounted on said shaft, a toothed endless chain mounted on said sprocket in a vertical plane, spaced idling sprockets engaging said chain and providing a vertical flight thereof, a knife mounted on said base adjacent said flight of said chain, and means cooperating with said base for adjusting the position of said knife with respect to said chain to bring said teeth into engagement with the shell of a coconut impaled on said knife, said chain moving in a direction such that said teeth impel the coconut onto said knife.

7. In a coconut shelling machine, a base, motor means mounted on said base, a horizontally disposed shaft driven by said motor means, a drive sprocket mounted on said shaft, a toothed endless chain mounted on said sprocket in a vertical plane, spaced idling sprockets engaging said chain and providing a vertical flight thereof, a knife mounted on said base adjacent said flight of said chain, guide means for said chain preventing displacement of said flight thereof away from said knife, and means for adjusting the position of said knife with respect to said chain to bring said teeth into engagement with the shell of a coconut impaled on said knife, said chain moving in a direction such that said teeth impel the coconut onto said knife.

8. A coconut shelling machine as described in claim 7 including guard means covering said chain and terminating in spaced resilient elements adjacent said knife, said teeth passing between said spaced resilient elements when said elements are displaced from said knife.

9. A coconut shelling machine as described in claim 7 in which said knife adjusting means include a knife base mounted for rotation on said first base, an arm secured to said knife base, and manually adjustable means connecting the extremity of said arm and said first base.

10. In a coconut shelling machine, a base, electric motor means mounted on said base, a horizontally disposed shaft driven by said motor means, a drive sprocket mounted on said shaft, a toothed endless chain mounted on said sprocket in a vertical plane, spaced idling sprockets engaging said chain and providing a vertical flight thereof, a knife mounted on said base adjacent said flight of said chain, guide means for said chain preventing displacement of said flight thereof away from said knife, means for adjusting the position of said knife with respect to said chain to bring said teeth into engagement with the shell of a coconut impaled on said knife including a knife base mounted for rotation on said first base, an arm carried by said knife base and means manually adjustable in length connecting the extremity of said arm and said first base, and guard means covering said chain and terminating in spaced resilient elements adjacent said knife, said teeth passing between said spaced resilient elements when said elements are displaced from said knife, said chain moving in a direction such that said teeth impel the coconut onto said knife.

References Cited in the file of this patent

UNITED STATES PATENTS

| | | |
|---|---|---|
| 2,523,301 | Hodson et al. | Sept. 26, 1950 |
| 2,569,207 | Waters | Sept. 25, 1951 |